US011465851B1

(12) United States Patent
Kuehl et al.

(10) Patent No.: US 11,465,851 B1
(45) Date of Patent: Oct. 11, 2022

(54) ROLLERLESS IDLER MODULE AND VEHICLE CONVEYOR SYSTEM HAVING THE SAME

(71) Applicant: Stephenson Technologies Inc., Barrie (CA)

(72) Inventors: Robert Allen Kuehl, Oro-Medonte (CA); Shane Patrick Peter Viccary, Barrie (CA); Daniel Thomas James Colvin, Barrie (CA)

(73) Assignee: Stephenson Technologies Inc., Ontario (CA)

(*) Notice: Subject to any disclaimer, the term of this patent is extended or adjusted under 35 U.S.C. 154(b) by 0 days.

(21) Appl. No.: 17/502,638

(22) Filed: Oct. 15, 2021

Related U.S. Application Data

(63) Continuation of application No. 17/499,445, filed on Oct. 12, 2021.

(51) Int. Cl.
| B65G 15/62 | (2006.01) |
| B60S 13/02 | (2006.01) |
| B65G 45/22 | (2006.01) |
| B65G 45/02 | (2006.01) |

(52) U.S. Cl.
CPC .............. B65G 15/62 (2013.01); B60S 13/02 (2013.01); B65G 45/02 (2013.01); B65G 45/22 (2013.01); B65G 2207/48 (2013.01)

(58) Field of Classification Search
CPC ........ B65G 15/62; B65G 45/22; B65G 21/00; B65G 45/02; B65G 2207/48; B60S 13/02

USPC .................................................. 198/835, 500
See application file for complete search history.

(56) References Cited

U.S. PATENT DOCUMENTS

| 3,090,296 | A | * | 5/1963 | Pechmann | B41F 19/06 |
| | | | | | 101/44 |
| 9,914,591 | B2 | * | 3/2018 | DeGroot | F16M 13/022 |
| 11,267,655 | B1 | * | 3/2022 | Rottier | B65G 15/62 |
| 2007/0017786 | A1 | * | 1/2007 | Hosch | B65G 47/66 |
| | | | | | 198/841 |
| 2013/0062167 | A1 | * | 3/2013 | Alotto | B65G 21/06 |
| | | | | | 198/813 |
| 2015/0183587 | A1 | * | 7/2015 | Toth | B65G 37/005 |
| | | | | | 198/604 |
| 2017/0217690 | A1 | * | 8/2017 | Stephenson | B65G 45/22 |

FOREIGN PATENT DOCUMENTS

JP 2002-106201 * 4/2002 ............... E04H 6/20

\* cited by examiner

*Primary Examiner* — James R Bidwell
(74) *Attorney, Agent, or Firm* — Laurence A. Greenberg; Werner H. Stemer; Ralph E. Locher

(57) ABSTRACT

A rollerless idler module and a vehicle conveyor system having the same are provided. The vehicle conveyor system has an endless belt, a drive end at which the endless belt is driven to rotate, and an idler end opposite the drive end. The rollerless idler module includes a rollerless idler having a working surface positionable to contact the endless belt spanning between an upper transport portion of the endless belt and a lower return portion of the endless belt at the idler end, and a support structure adapted to secure the rollerless idler in a substantially stationary orientation.

29 Claims, 14 Drawing Sheets

US 11,465,851 B1

ROLLERLESS IDLER MODULE AND VEHICLE CONVEYOR SYSTEM HAVING THE SAME

CROSS-REFERENCE TO RELATED APPLICATIONS

This application is a continuation of U.S. application Ser. No. 17/499,445, filed Oct. 12, 2021, the contents of which are incorporated herein by reference in their entirety.

FIELD

The specification relates generally to conveyors, and in particular to a rollerless idler module and a vehicle conveyor system having the same.

BACKGROUND OF THE DISCLOSURE

Vehicle conveyor assemblies are known. An exemplary state-of-the-art vehicle conveyor configuration is shown in FIG. 1 and includes one or more endless belts 20 that are mounted on at least two rollers 24, 26. A support surface 28 is positioned under an upper transport portion 32 of each endless belt 20 to support the weight of vehicles 36 being conveyed by the endless belt 20. Roller 24 is a drive sprocket drum positioned at a drive end 40 of the vehicle conveyor system towards a trailing edge 44 of the upper transport portion 32 of the endless belt 20 and has teeth to engage and drive the endless belt 20 to rotate about the rollers 24, 26 in a travel direction TD. Roller 26 is an idler roller positioned towards an idler end 48 of the vehicle conveyor system towards a leading edge 52 of the upper transport portion 32 of the endless belt 20, and freely rotates to support the rotation of the endless belt 20. Guide members in the form of freely rotating support rollers 56 support the lower return portion 60 of the endless belt 20.

FIGS. 2 and 3 show a portion of the vehicle conveyor system of FIG. 1 around the idler end 48. As the endless belt 20 rotates, it contacts an outer surface 64 of the idler roller 26 as it moves from the lower return portion 60 to the upper transport portion 32. The outer surface 64 of the idler roller is typically constructed of a material having a sufficient coefficient of friction with the endless belt 20, such as for example rubber, so that the endless belt 20 engages the outer surface 64 of the idler roller 26, causing the idler roller 26 to rotate on its bearing. The endless belt 20 then travels towards the drive end across the support surface 28. The support surface 28 is typically a generally smooth, planar surface made of any suitable material, such as stainless steel, over which the upper transport portion 32 of the endless belt 20 travels, and bears the weight of the vehicles positioned on the upper transport portion 32. In between the outer surface 64 of the idler roller 26 and the support surface 28 is a clearance gap 68 to ensure that the idler roller 26 can freely rotate.

During operation of the vehicle conveyor system, debris can be introduced into the clearance gap 68 and get trapped between the idler roller 26 and the support surface 28. This trapped debris can pit the outer surface 64 and interfere with the free rotation of the idler roller 26, thereby leading to damage of the bearing structure of the idler roller 26. As the clearance gap 68 increases in size as a result of the wear, the debris can drop down onto the top surface of the lower return portion 60 only to become trapped between the endless belt 20 and the outer surface 64 of the idler roller 26 and reintroduced into the clearance gap 68, thereby accelerating wear. Further, other forces such as provided by the weight of the vehicle 36 can also lead to wear of the bearing structure (e.g., the ball bearings) of the idler roller 26. As a result, maintenance and/or replacement of the idler roller 26 can be required. A resulting failure of the bearings of the idler roller can damage the drive motor driving the drive roller as the idler roller may cease to rotate and the friction between the idler roller and the endless belt is significant. Further, the bearings of such idler rollers have to be provided with a certain amount of bearing grease. Errors in the amount of bearing grease provided can damage the bearing function of the idler roller, providing an additional condition to failure.

SUMMARY OF THE DISCLOSURE

In an aspect, there is provided a rollerless idler module for a vehicle conveyor system having an endless belt, a drive end at which the endless belt is driven to rotate, and an idler end opposite the drive end, comprising: a rollerless idler having a convex surface positionable to contact the endless belt spanning between an upper transport portion of the endless belt and a lower return portion of the endless belt at the idler end; and a support structure adapted to secure the rollerless idler in a substantially stationary orientation.

The working surface can include a convex surface positionable to contact the endless belt at the idler end and spanning between the upper transport portion of the endless belt and the lower return portion of the endless belt extending towards the drive end.

The working surface can include a substantially planar upper surface that is positioned to support the upper transport portion of the endless belt when the convex surface is positioned to contact the endless belt between the upper transport portion of the endless belt and the lower transport portion of the endless belt.

The working surface can include a lower surface extending from the convex surface that is positioned to contact the lower return portion of the endless belt when the convex surface is positioned to contact the endless belt between the upper transport portion of the endless belt and the lower return portion of the endless belt.

A trailing edge of the upper surface can be substantially oblique to a transverse axis that is normal to a travel direction of the upper transport portion of the endless belt when the convex surface is positioned to contact the endless belt between the upper transport portion of the endless belt and the lower transport portion of the endless belt.

The working surface can have surface properties selected such that the working surface and the endless belt have a coefficient of friction that prevents adhesion of the endless belt with the working surface as the endless belt is travelling therearound. The working surface can have surface properties selected such that the working surface and the endless belt have a coefficient of friction that is lower than about 0.50. The working surface can have surface properties selected such that the working surface and the endless belt have a coefficient of friction that is lower than about 0.36. The working surface can have surface properties selected such that the working surface and the endless belt have a coefficient of friction that is lower than about 0.30. The working surface can have surface properties selected such that the working surface and the endless belt have a coefficient of friction that is lower than about 0.20. The working surface can have surface properties selected such that the working surface and the endless belt have a coefficient of friction that is lower than about 0.15.

The working surface can be at least partially made of polytetrafluoroethylene.

The working surface can be at least partially made of a polymer. The polymer can be an ultra high molecular weight polyethylene (UHMW). An additive can be added to the UHMW to decrease the coefficient of friction of the working surface.

The working surface can be at least partially made of stainless steel.

The support structure can include a shaft around which the rollerless idler is positioned, and at least one bracket adapted to secure the shaft. The shaft can have at least one end with a non-circular profile, and the at least one bracket can have an aperture shaped to receive the at least one end of the shaft to prevent rotation of the shaft, and an upper transport surface support can extend from the shaft to support the rollerless idler extending from the convex surface and positioned above the shaft when the convex surface is positioned to contact the endless belt between the upper transport portion of the endless belt and the lower transport portion of the endless belt.

The rollerless idler module can further include a fluid introduction arrangement in fluid communication with a fluid source and positioned to introduce fluid onto the endless belt through at least one aperture in the rollerless idler. The fluid can include a surfactant.

The rollerless idler module can further include a fluid introduction arrangement in fluid communication with a fluid source and positioned to introduce fluid onto the lower return portion of the endless belt prior to its contact with the rollerless idler. The fluid can include a surfactant.

In another aspect, there is provided a vehicle conveyor system, comprising: a vehicle conveyor system having an endless belt, a drive end at which the endless belt is driven to rotate, and an idler end opposite the drive end; a rollerless idler having a working surface contacting the endless belt at the idler end spanning between an upper transport portion of the endless belt extending towards the drive end positioned to transport a vehicle thereon and a lower return portion of the endless belt extending towards the drive end; and a support structure securing the rollerless idler in a substantially stationary orientation.

The working surface can include a convex surface contacting the endless belt at the idler end and spanning between the upper transport portion of the endless belt and the lower return portion of the endless belt extending towards the drive end.

The working surface can include a substantially planar upper surface supporting the upper transport portion of the endless belt.

The working surface can include a lower surface extending from the convex surface contacting the lower return portion of the endless belt.

A trailing edge of the upper surface can be substantially oblique to a transverse axis that is normal to a travel direction of the upper transport portion of the endless belt.

The working surface can have surface properties selected such that the working surface and the endless belt have a coefficient of friction that prevents adhesion of the endless belt with the working surface as the endless belt is travelling therearound. The working surface can have surface properties selected such that the working surface and the endless belt have a coefficient of friction that is lower than about 0.50. The working surface can have surface properties selected such that the working surface and the endless belt have a coefficient of friction that is lower than about 0.36. The working surface can have surface properties selected such that the working surface and the endless belt have a coefficient of friction that is lower than about 0.30. The working surface can have surface properties selected such that the working surface and the endless belt have a coefficient of friction that is lower than about 0.20. The working surface can have surface properties selected such that the working surface and the endless belt have a coefficient of friction that is lower than about 0.15.

The working surface can be at least partially made of polytetrafluoroethylene.

The working surface can be at least partially made of a polymer. The polymer can be an ultra high molecular weight polyethylene (UHMW). An additive can be added to the UHMW to decrease the coefficient of friction of the working surface.

The working surface can be at least partially made of stainless steel.

The support structure can include a shaft around which the rollerless idler is positioned, and at least one bracket adapted to secure the shaft. The shaft can have at least one end with a non-circular profile, the at least one bracket having an aperture shaped to receive the at least one end of the shaft to prevent rotation of the shaft, and an upper transport surface support extending from the shaft to support the rollerless idler extending from the convex surface and positioned above the shaft.

The vehicle conveyor system can further include a fluid introduction arrangement in fluid communication with a fluid source and positioned to introduce fluid onto the endless belt through at least one aperture in the rollerless idler. The fluid can include a surfactant.

The rollerless idler module can further include a fluid introduction arrangement in fluid communication with a fluid source and positioned to introduce fluid onto the lower return portion of the endless belt prior to its contact with the rollerless idler. The fluid includes a surfactant.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
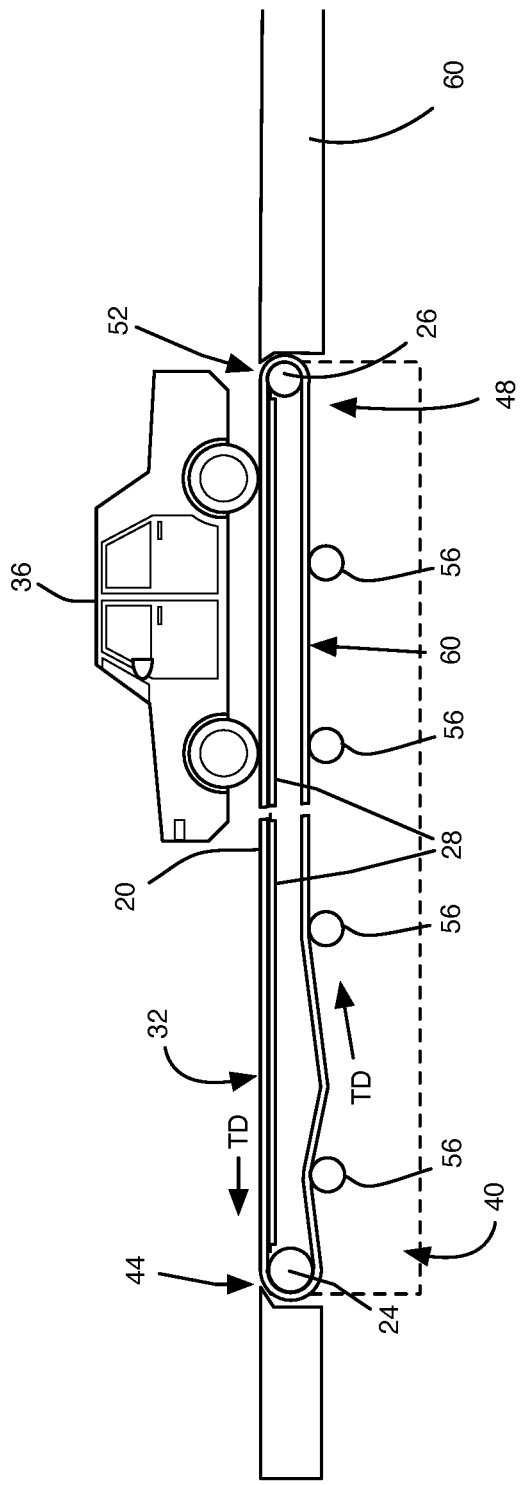
FIG. 1 shows a side schematic view of a state-of-the-art vehicle conveyor system having an endless belt driven by a drive roller and rotated around an idler roller at an idler end of the vehicle conveyor system.
Figure 2:
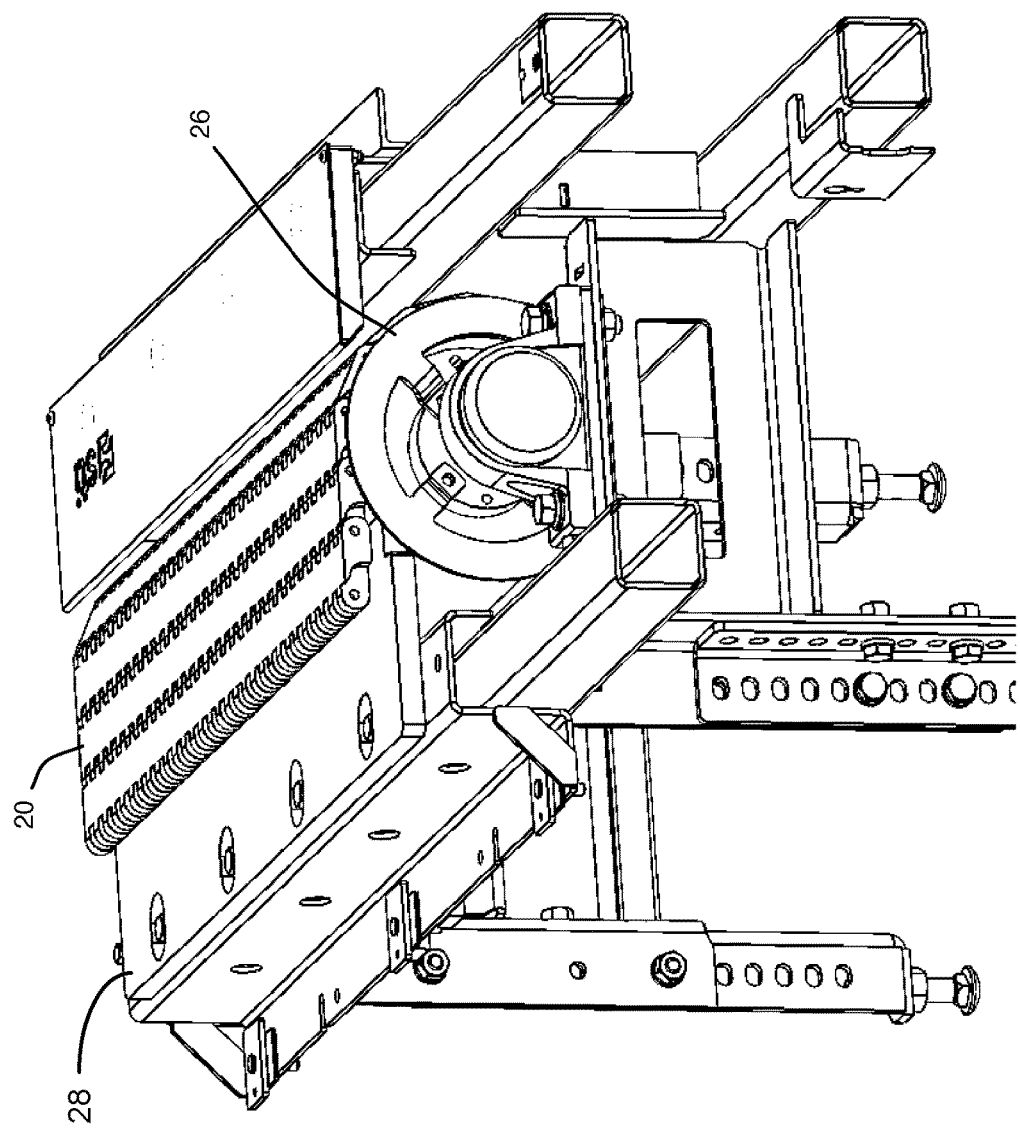
FIG. 2 is an isometric view of a portion of the idler end of the vehicle conveyor system of FIG. 1.
Figure 3:
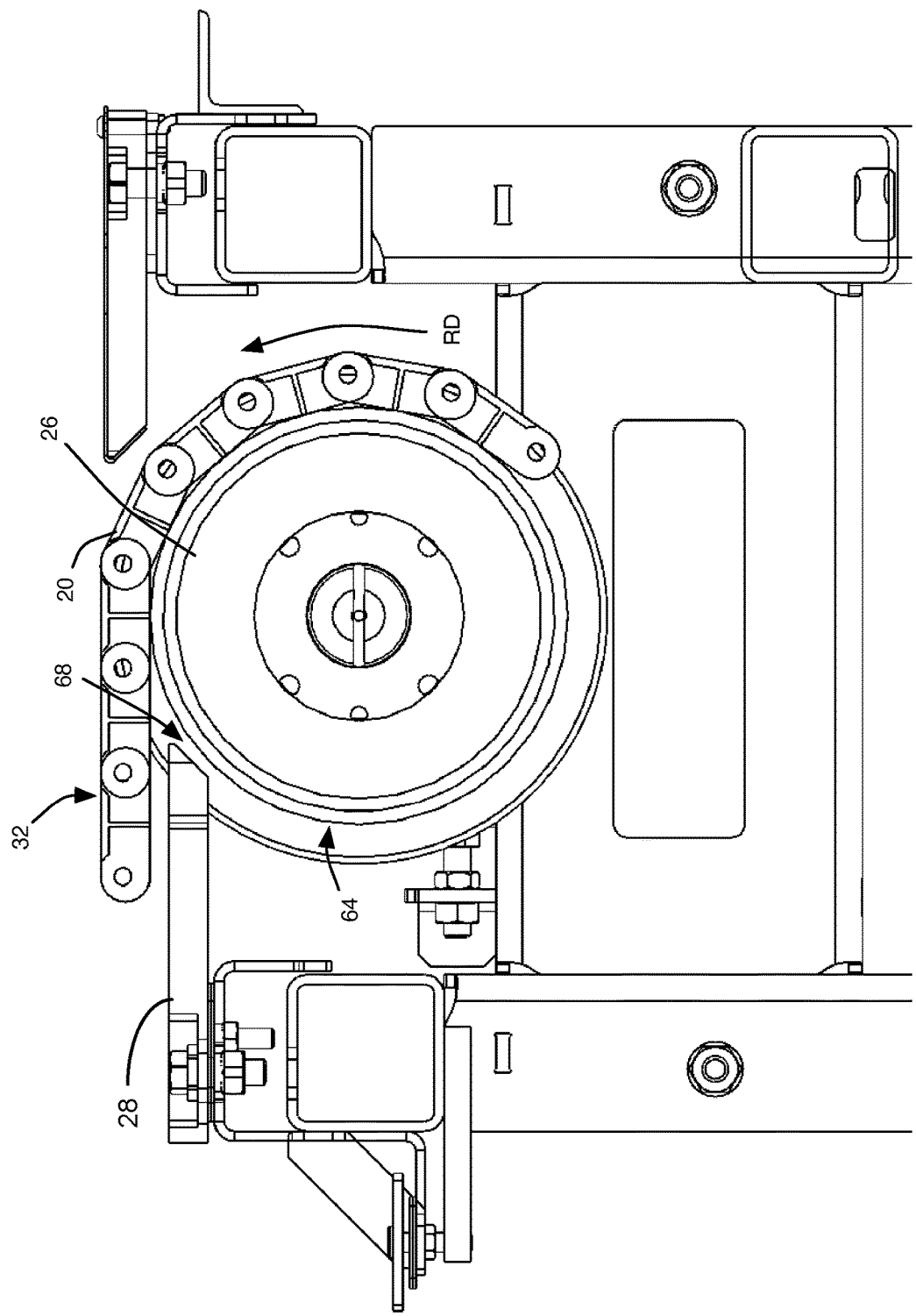
FIG. 3 is a side view of the portion of the idler end of the vehicle conveyor system of FIG. 2.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

A rollerless idler module for a vehicle conveyor system and a vehicle conveyor system having the same is provided. The vehicle conveyor system has an endless belt, a drive end at which the endless belt is driven to rotate, and an idler end opposite the drive end. The rollerless idler generally has a stationary orientation and has a working surface positionable to contact the endless belt at the idler end spanning between an upper transport portion of the endless belt extending towards the drive end positioned to transport a vehicle thereon, and a lower return portion of the endless belt at the idler end extending towards the drive end. By using a stationary working surface over which the endless belt can glide over as it transitions from the lower return portion to the upper transport portion, failures relating to the mechanical bearings of idler rollers can be avoided. Further, by alleviating the need for gaps between a roller and a support structure for the upper transport portion, gaps in which debris can become trapped and mechanically deteriorate components of the vehicle conveyor assembly can be avoided entirely.

Figure 4:
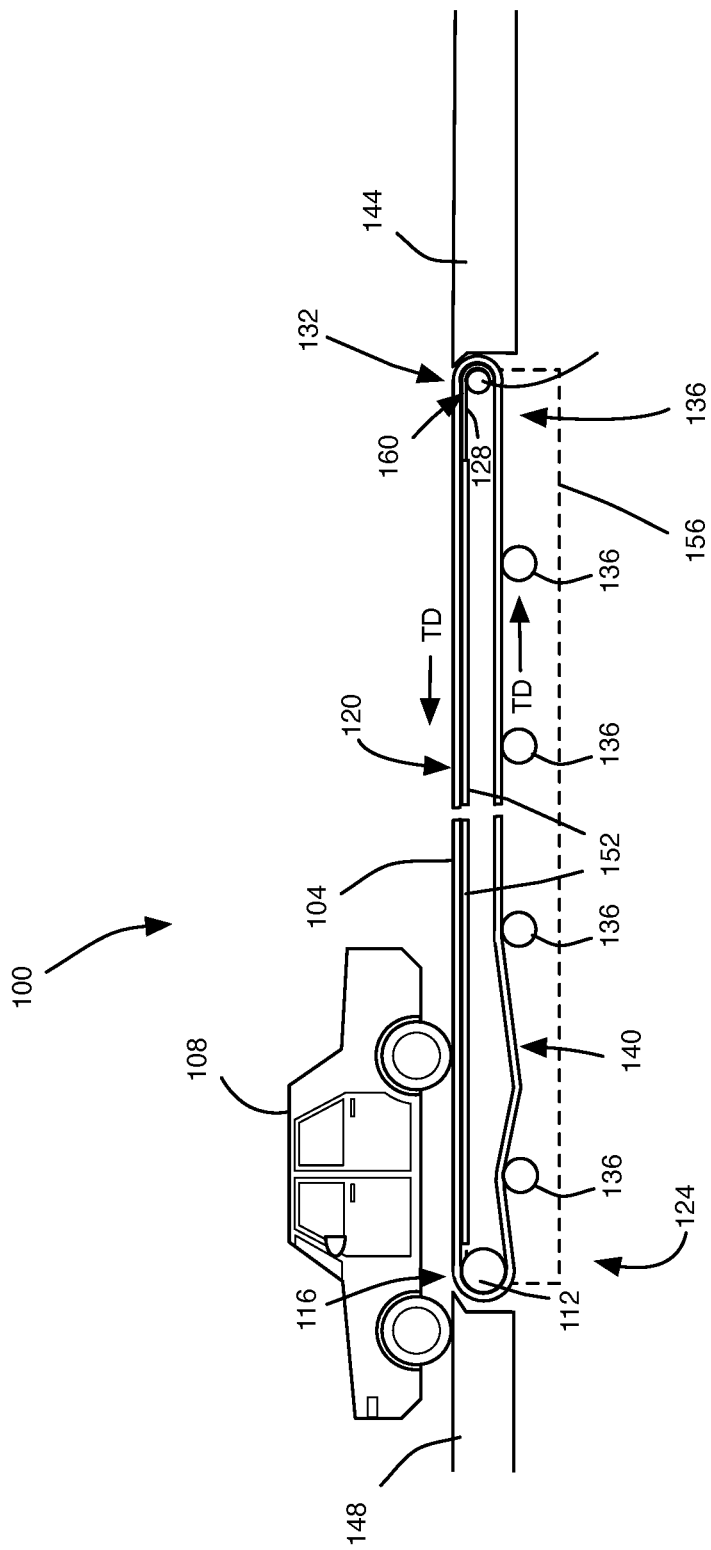
FIG. 4 is a side schematic view of a vehicle conveyor system employing a rollerless idler in accordance with an embodiment.

FIG. 4 shows a vehicle conveyor system 100 employing a pair of endless belts 104 in accordance with an embodiment. One of the endless belts 104 is to be positioned under the left wheels of a vehicle 108 and the other of the endless belts 104 is to be positioned under the right wheels of the vehicle 108. The endless belts 104 are made of a set of plastic links that are pivotally coupled together. Each of the endless belts 104 spans between a drive roller 112 towards a trailing edge 116 of an upper transport portion 120 of the endless belt 104 at a drive end 124 of the vehicle conveyor system 100 and a rollerless idler 128 towards a leading edge 132 of the upper transport portion 120 at an idler end 136 of the vehicle conveyor system 100. The upper transport portion 120 extends from the rollerless idler 128 towards the drive end 124 and is positioned to transport the vehicle 108 thereon. A lower return portion 140 extends from the rollerless idler 128 towards the drive end 124. The drive roller 112 is positioned at the drive end 124 and is a drive sprocket drum that has teeth to engage and drive the endless belt 104 to rotate about the drive roller 112 and the rollerless idler 128. Guide members in the form of freely rotating support rollers 136 support the lower return portion 140 of the endless belt 104. The endless belt 104 rotates around the drive roller 112 and the rollerless idler 120 in a travel direction TD. The leading edge 132 of the upper transport portion 120 is positioned adjacent to a front drive surface 144, and the trailing edge 116 is positioned adjacent to a rear drive surface 148. A support surface 152 is positioned under the upper transport portion 120 of the endless belt 104 to support the weight of the vehicle 108 and provide a generally low-friction surface over which the endless belt 104 travels. The drive roller 112, the rollerless idler 128, the support rollers 136, and the support surface 152 are all connected to a conveyor frame 156, a portion of which is shown.

Figure 5:
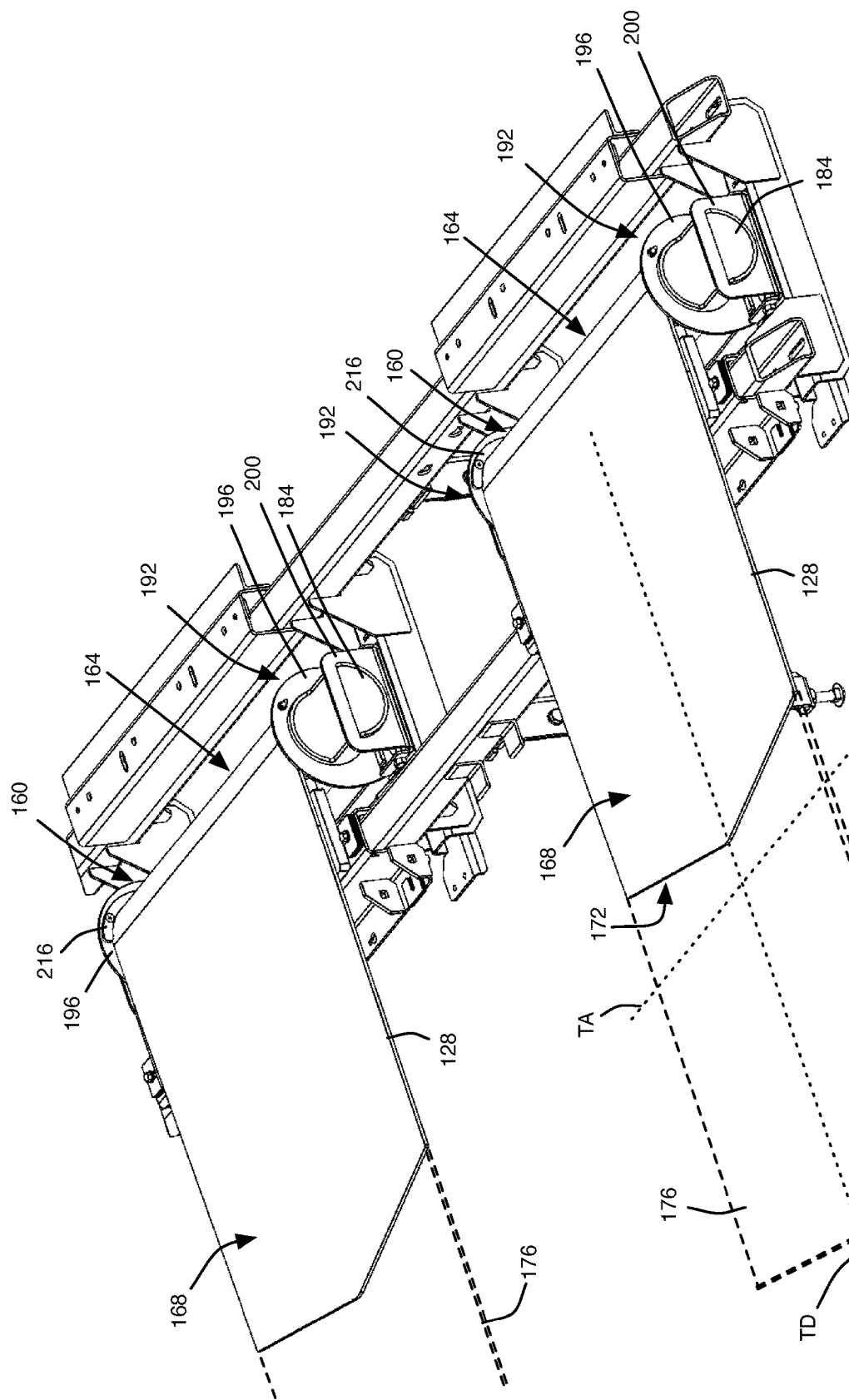
FIG. 5 is a top, left, rear isometric view of a portion of the idler end of the vehicle conveyor system showing the rollerless idler module.
Figure 6:
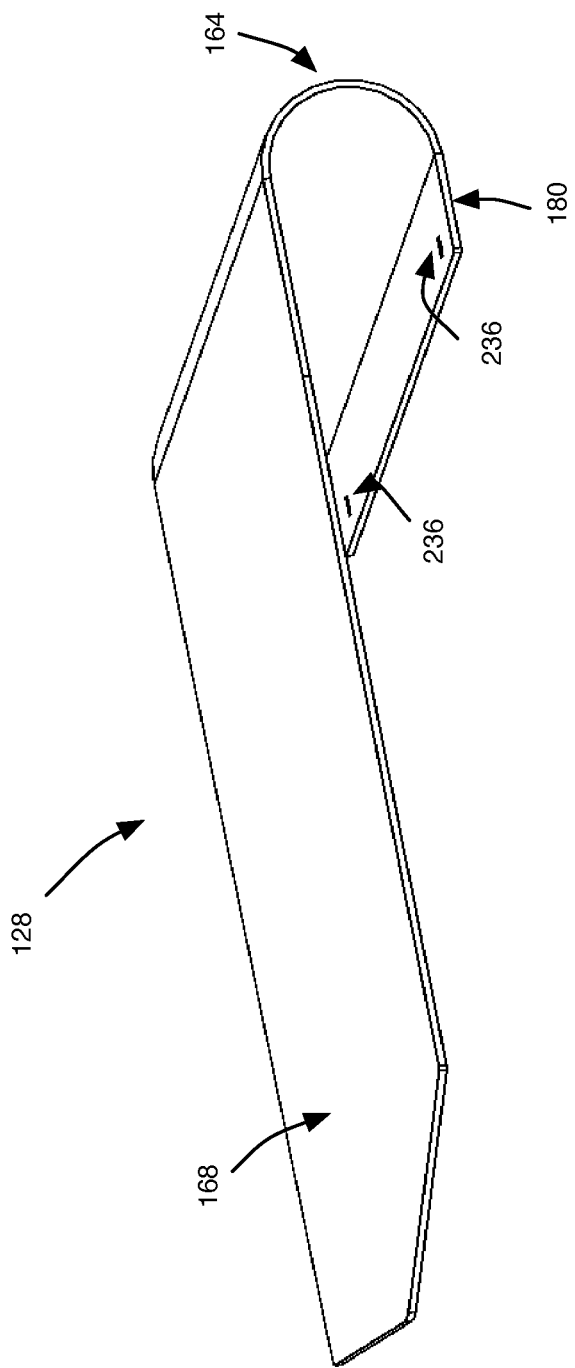
FIG. 6 is a top, left, rear isometric view of the rollerless idler module of FIG. 5 in isolation.
Figure 7:
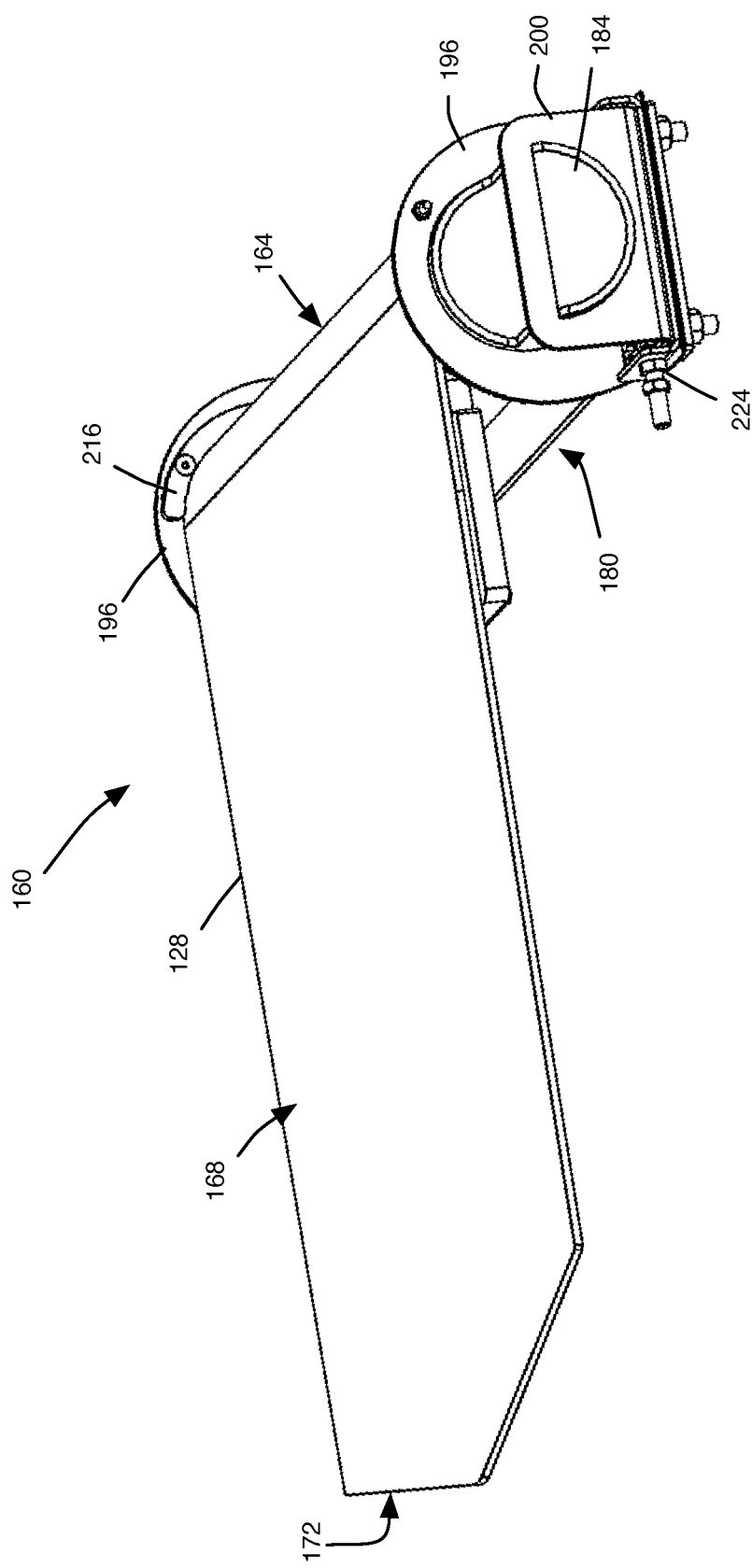
FIG. 7 is a left side elevation view of the rollerless idler module of FIG. 6.
Figure 8:
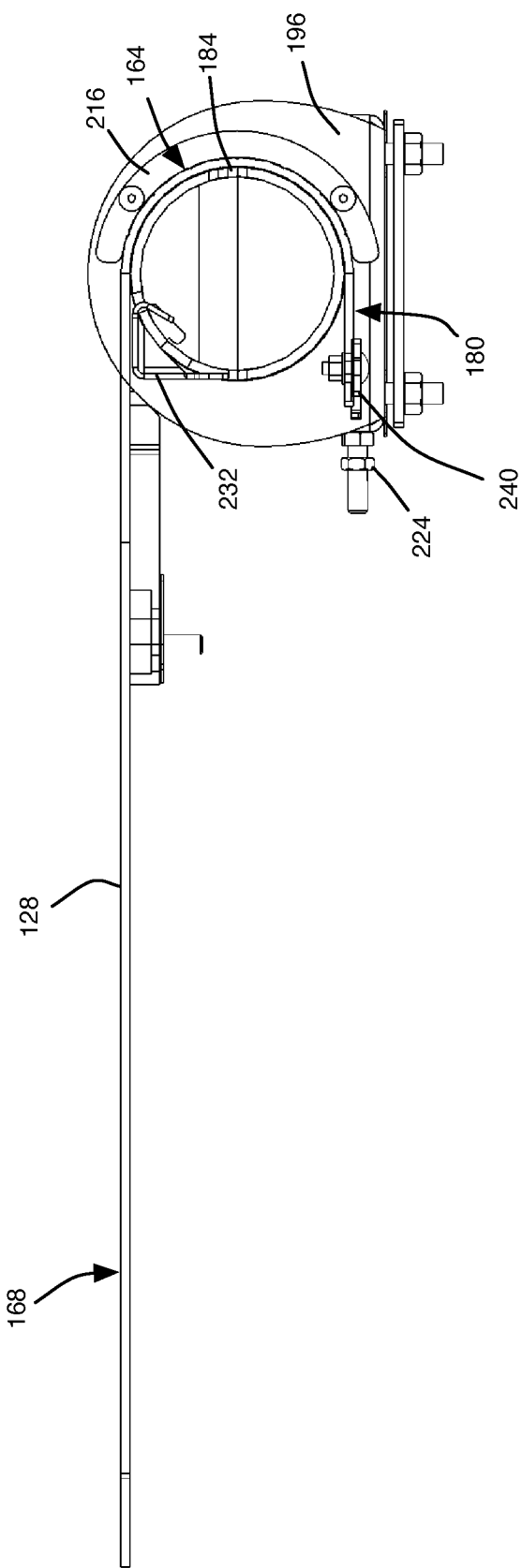
FIG. 8 shows the rollerless idler module of FIG. 7 with the endless belt mounted thereon.

The rollerless idler 128 forms part of a rollerless idler module 160 that is shown in greater detail in FIGS. 5 and 6. A pair of rollerless idler assemblies 160 is shown positioned to receive left and right wheels of vehicles. Each of the rollerless idler assemblies 160 include the rollerless idler 128 that has a working surface that is positionable to contact the endless belt 104. The working surface includes a convex surface 164 that is positionable to contact the endless belt 104 at the idler end 136 spanning between an upper transport portion 120 of the endless belt 104 and a lower return portion 140 of the endless belt 104.

A substantially planar upper transport surface 168 extends from the convex surface 164 and is positioned under the upper transport portion 120 of the endless belt 104 when the rollerless idler 128 is secured in the substantially stationary position and orientation 104 relative to the vehicle conveyor system 100, including the endless belt 104, the drive roller 112, and the conveyor frame 156; that is, when the convex surface 164 is positioned to contact the endless belt 104 between the upper transport portion 120 of the endless belt 104 and the lower transport portion 140 of the endless belt 104. As the upper transport portion 120 is employed to transport vehicles along a horizontal linear path, it is desirable to support travel of the endless belt 104 along this horizontal path by a combination of the upper transport surface 168 and the support surface 152.

A trailing edge 172 of the upper transport surface 168 is substantially oblique to a transverse axis TA that is normal to the travel direction TD of the upper transport portion of the endless belt 104. It has been found that, by making the trailing edge 172 oblique, wear on the endless belt 104 as it transitions to a wear plate 176 forming part of the support surface 152 is reduced in contrast to a transverse joint. The wear plate 176 is formed with a corresponding leading edge to dovetail with the trailing edge 172 of the rollerless idler 128.

Referring now to FIGS. 4 to 9, the rollerless idler 128 also has a substantially planar lower return surface 180 extending from the convex surface that is positioned to contact the lower return portion of the endless belt when the convex surface 164 is positioned to contact the endless belt 104 between the upper transport portion 120 of the endless belt 104 and the lower return portion 140 of the endless belt 104. The lower return surface 180 enables the endless belt 104 to smoothly come into contact with the convex surface 164 of the rollerless idler 128 without encountering an edge to avoid excess wear on the endless belt 104. As the lower return portion 140 approaches the rollerless idler 128 from a lower position, the lower return surface 180 may provide sufficient lead-in to the convex surface 164 of the rollerless idler 128. While, in this embodiment, the lower return surface 180 of the rollerless idler 128 extends substantially parallel to the support surface 152 when the rollerless idler 128 is installed, the lower return surface 180 extending from the rollerless idler 128 can be of any suitable shape and preferably eases the endless belt 104 into contact with the convex surface 164 of the rollerless idler 128 without encountering any edges. That is, the lower return surface 180 extends upwardly and away from the path of the endless belt 104.

Figure 9:
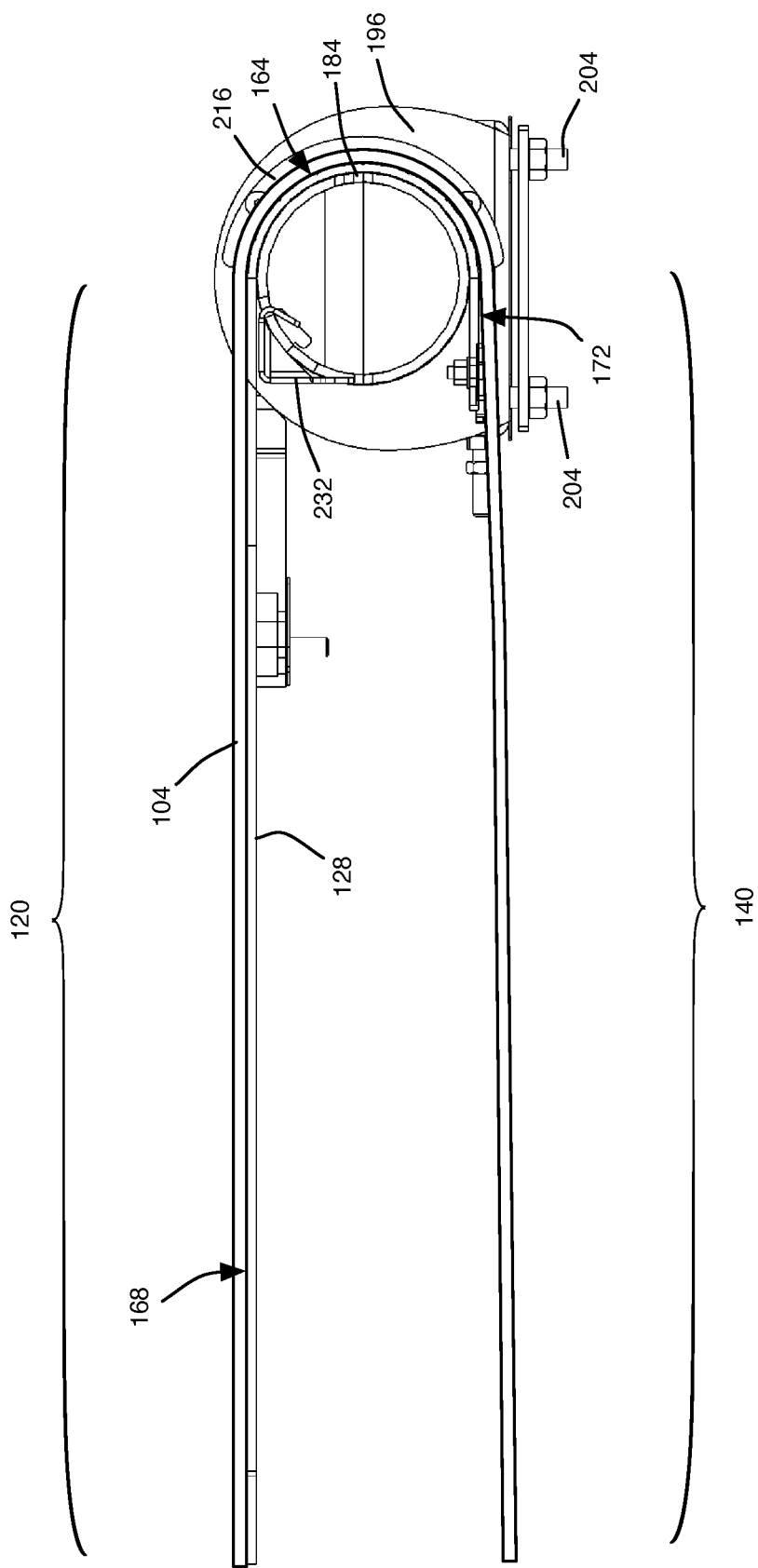
FIG. 9 is a top, left, rear isometric view of the rollerless idler of the rollerless idler of FIGS. 5 and 6 in isolation.

This is particularly shown in FIG. 9, where the path of the endless belt 104 is shown relative to the rollerless idler 128. As shown, the upper transport portion 120 of the endless belt 104 is that portion extending and travelling from the convex surface 164 of the rollerless idler 128 to the drive roller 112, at least some of which is used to transport vehicles positioned thereon. The lower return portion 140 of the endless belt 104 is that portion extending and travelling from the drive roller 112 of the rollerless idler 128 to the convex surface 164.

Any suitable material can be used to make the rollerless idler 128. The rollerless idler 128 can be made unitarily or can be an assembled component. The material for the working surface, meaning the surface of the rollerless idler 128 coming into contact with the endless belt 104 including the convex surface 164, the upper transport surface 168, and the lower return surface 180, is selected so that the working surface and the endless belt 104 have a coefficient of friction that prevents adhesion of the endless belt 104 with the convex surface 164 as the endless belt 104 is travelling therearound.

In one configuration, the working surface of the rollerless idler 128 can have surface properties selected such that the working surface and the endless belt 104 have a coefficient of friction that is lower than about 0.5. Preferably, the working surface of the rollerless idler 128 can have surface properties selected such that the working surface and the endless belt 104 have a coefficient of friction that is lower than about 0.36. More preferably, the working surface of the rollerless idler 128 can have surface properties selected such that the working surface and the endless belt 104 have a coefficient of friction that is lower than about 0.30. Still more preferably, the working surface of the rollerless idler 128 can have surface properties selected such that the working surface and the endless belt 104 have a coefficient of friction that is lower than about 0.20. Still yet more preferably, the working surface of the rollerless idler 128 can have surface properties selected such that the working surface and the endless belt 104 have a coefficient of friction that is lower than about 0.15.

In the illustrated configuration, the rollerless idler 128 is of a unitary construction. The rollerless idler 128, and thus the working surface is at least partially made of a polymer, and, in particular, an ultra high molecular weight polyethylene (UHMW). UHMW is an extremely tough plastic with high abrasion and wear and chemical resistance. The UHMW can be heat-formed or bent to form the rollerless idler 128. In a current configuration, the UHMW is ¼ inch thick, but can be other thicknesses in other embodiments. Further, while the thickness in the current embodiment is generally uniform, the thickness can be varied across the rollerless idler in other embodiments. The coefficient of friction between the endless belt 104 and the working surface of the rollerless idler 128 is 0.18 when there is no dirt introduced between them, and 0.35 when there is dirt between the endless belt 104 and the working surface.

While UHMW by itself provides a low coefficient of friction with the endless belt, it has been found that by using UHMW blended with low friction additives, such as molybdenum disulfide, the durability of the working surfaces can be increased. In another configuration, the working surface of the rollerless idler 128 can be at least partially made of polytetrafluoroethylene. In a further configuration, the working surface of the rollerless idler 128 is at least partially made of stainless steel.

The radius of the convex surface 168 is selected to reduce the force urging segments of the endless belt 104 into contact with the convex surface 168.

Figure 10:
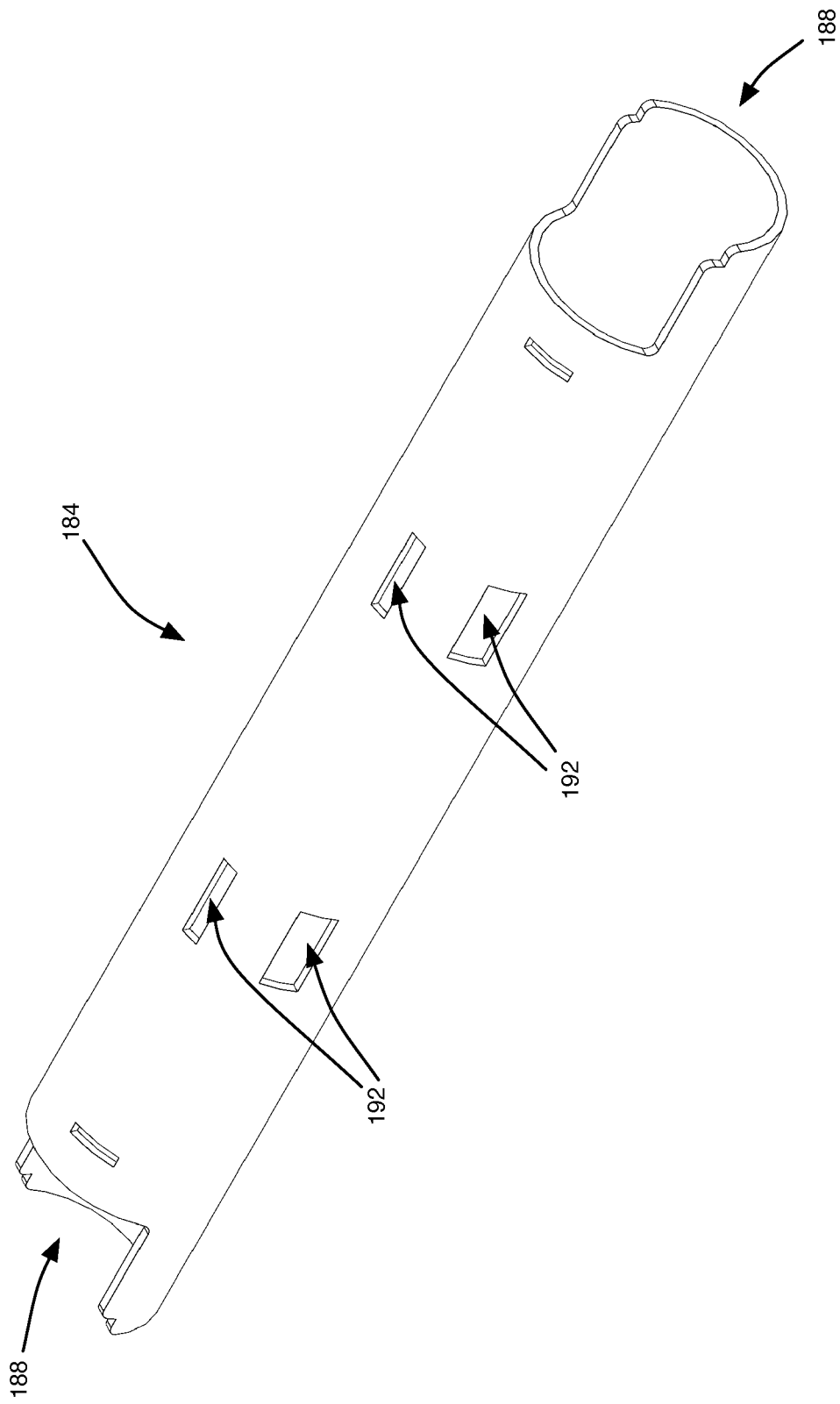
FIG. 10 is a top, left, rear isometric view of a support shaft of the rollerless idler module of FIGS. 5 to 9 around which the rollerless idler of FIG. 8 is positioned.

The rollerless idler 128 is connected to a support structure 168 adapted to secure the rollerless idler 128 in a substantially stationary position and orientation 104 to the conveyor frame 156. The support structure 168 includes a tubular support shaft 184 around which the rollerless idler is positioned. The support shaft 184 is made of stainless steel, but can be made of other materials that are suitably rigid. As shown in FIG. 10, the profile of the support shaft 184 is generally round, but the longitudinal ends 188 of the support shaft 184 are laser cut so that their profile is non-circular and, in particular, generally semi-circular.

Figure 11:
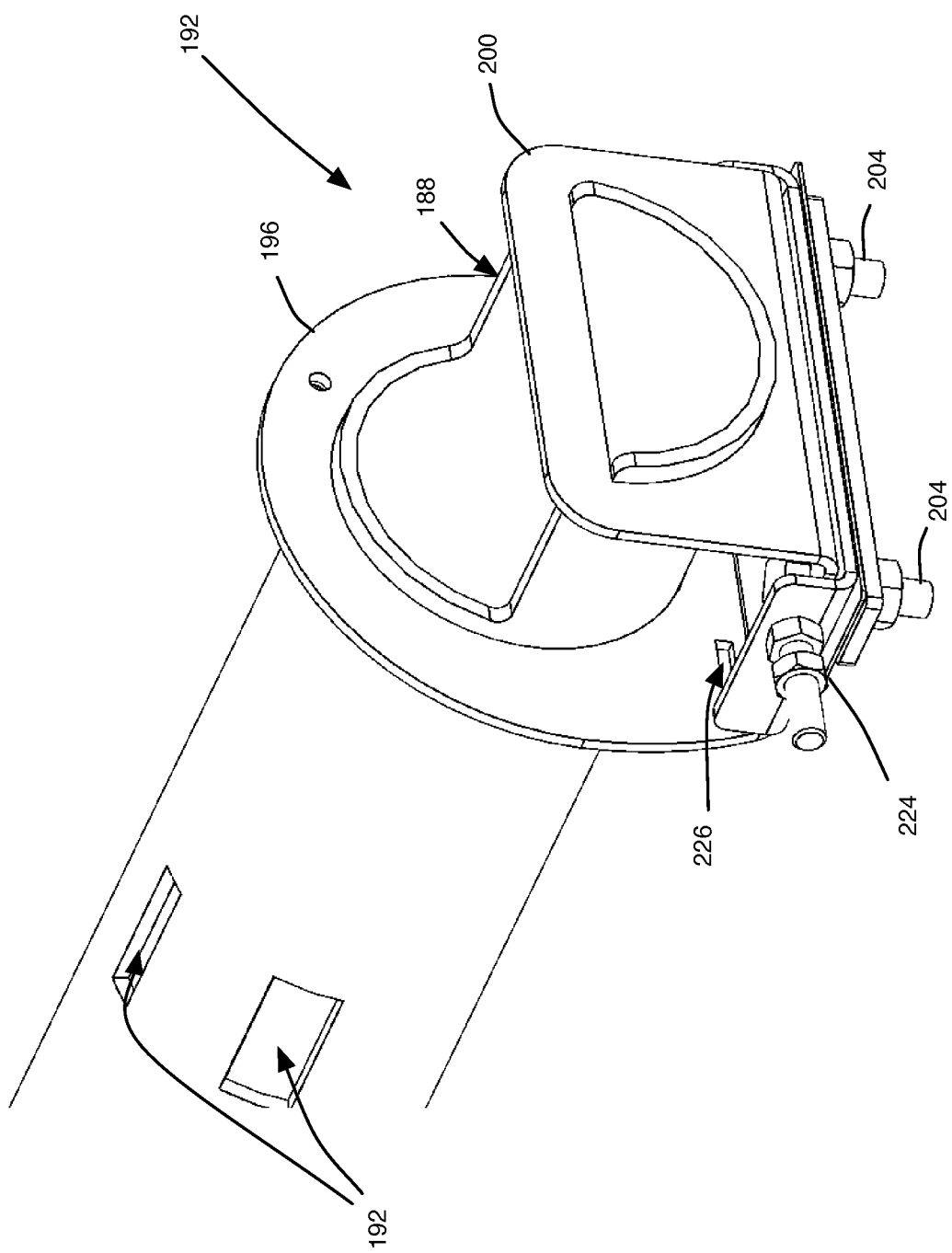
FIG. 11 is a top, left, rear isometric view of the bracket for supporting the support shaft of FIGS. 5 to 9 in its orientation and securing the rollerless idler.
Figure 12:
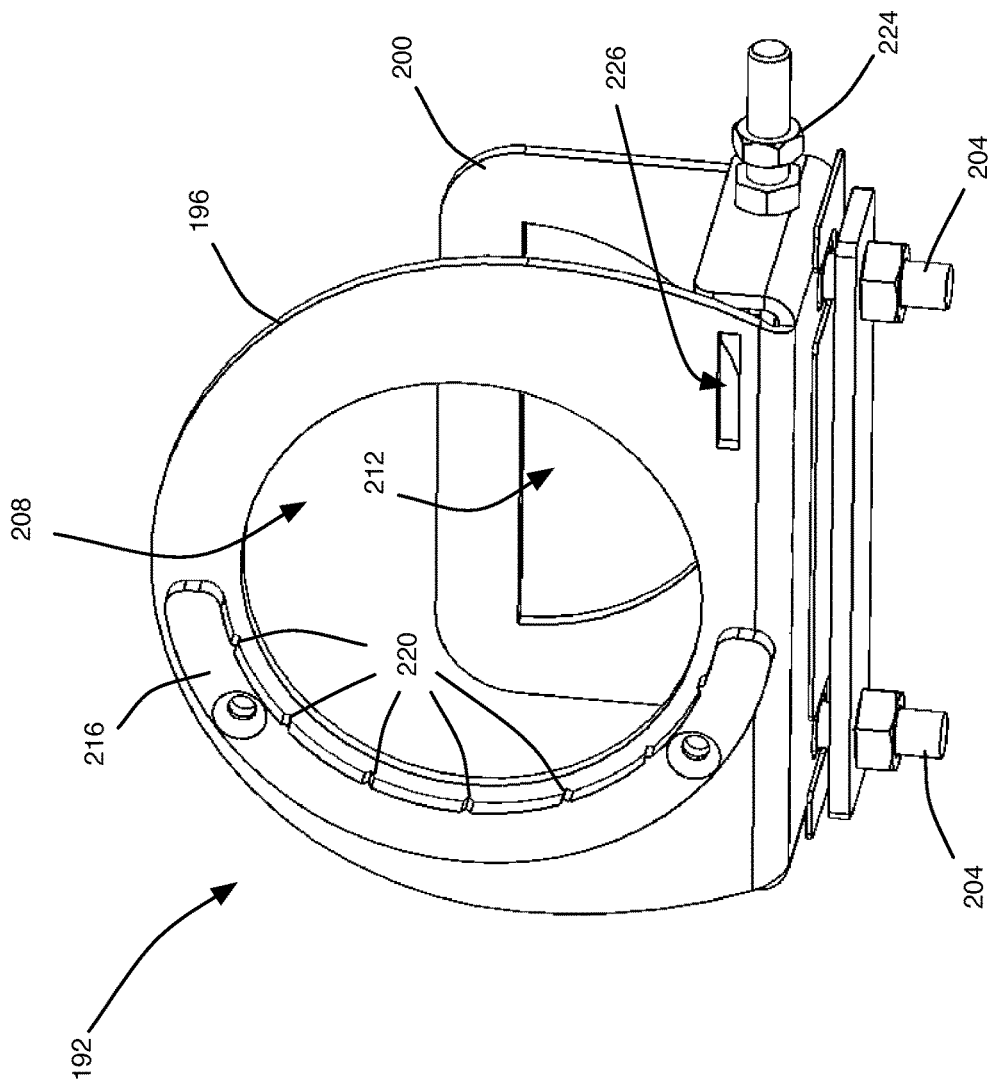
FIG. 12 is a bottom, right, rear isometric view of the bracket of FIG. 11.
Figure 13:
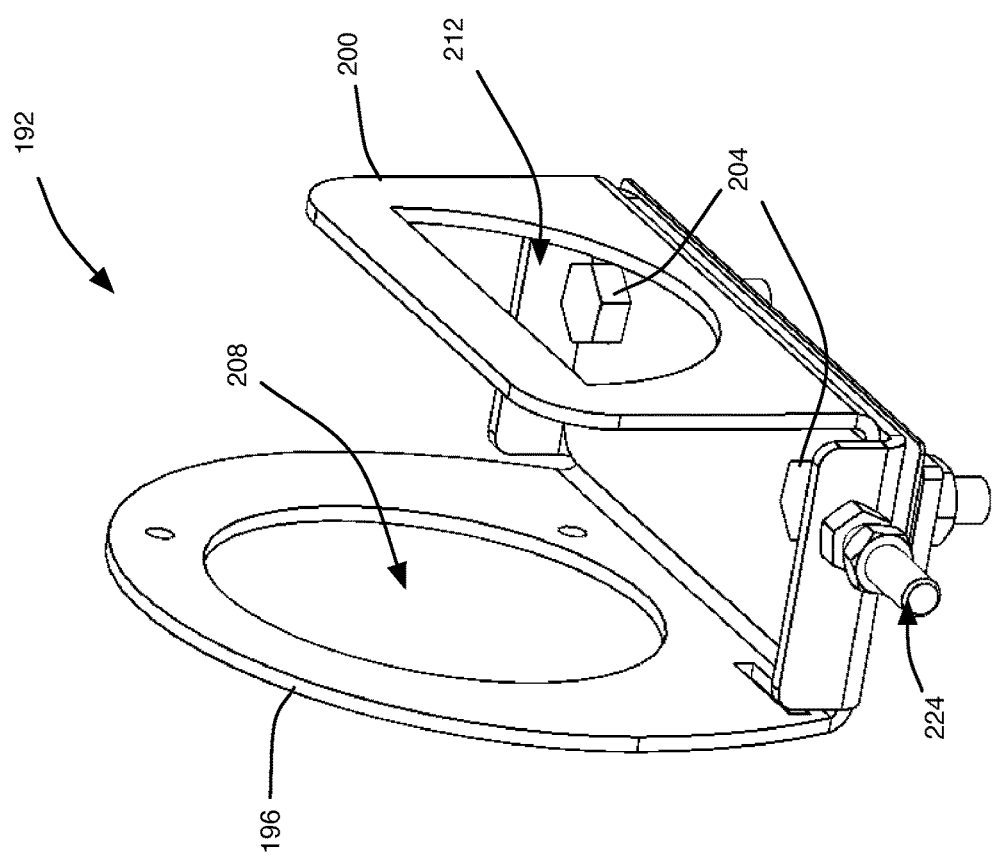
FIG. 13 is a top, left, rear isometric view of the bracket of FIG. 12.

Turning now to FIGS. 11 to 13, an end bracket 192 is fitted over each longitudinal end 188 of the support shaft 184 and is adapted to secure the support shaft to the conveyor frame 156. The end bracket 192 includes an inner bracket portion 196 and an outer bracket portion 200. The inner bracket portion 196 and the outer bracket portion 200 are secured together via bolts 204 that also secure the end bracket to the conveyor frame 156. The inner bracket portion 192 has a circular aperture 208 for receiving the support shaft 184, and the outer bracket portion 200 has a semi-circular aperture 212 for receiving the longitudinal end 188 of the support shaft 184. When the longitudinal ends 188 of the support shaft 184 are positioned in the semi-circular apertures 212 of the outer bracket portions 200 and the end brackets 192 are secured to the conveyor frame 156, the support shaft 184 is inhibited from rotating and is securely held therebetween. A toothed clamp 216 having a set of teeth 220 is secured to the inner bracket portion and clamps the rollerless idler 128. Where a harder material is selected for the rollerless idler 128, the clamping system may be varied. Longitudinal alignment of each of the longitudinal ends 188 of the support shaft 184 can be effected via alignment screws 224. A slot 226 is provided in each inner bracket portion 196.

Referring again to FIGS. 8 to 11, support apertures 228 laser cut in the side of the support shaft 184 enable an upper transport surface support 232 to be secured thereto to support the upper transport surface 168 adjacent to the support shaft 184. The upper transport surface support 232 extends from the support shaft 184 and is positioned above the support shaft 184. The upper transport surface 168 of the rollerless idler 128 is supported by the conveyor frame 156 beyond the support shaft 184, and the upper transport surface support 232 mitigates buckling of the upper transport surface 168 adjacent the support shaft 184. The rollerless idler 128 is secured to a bar 236.

Now referring to FIG. 6, a set of securing apertures 236 in the lower return surface 180 enable the lower return surface 180 to be secured to a bar 240 that is fitted in the slots 226 of the inner bracket portions 196, thereby preventing movement and/or reorientation of the rollerless idler 128.

While, in the above-described embodiment, the support structure is a structure that is secured to the rollerless idler, in other embodiments, the support structure can be integrally formed with the rollerless idler. That is, the rollerless idler can be of a unitary construction and include features that enable its securement to a conveyor frame or other structure to maintain the rollerless idler in a substantially stationary orientation.

Figure 14:
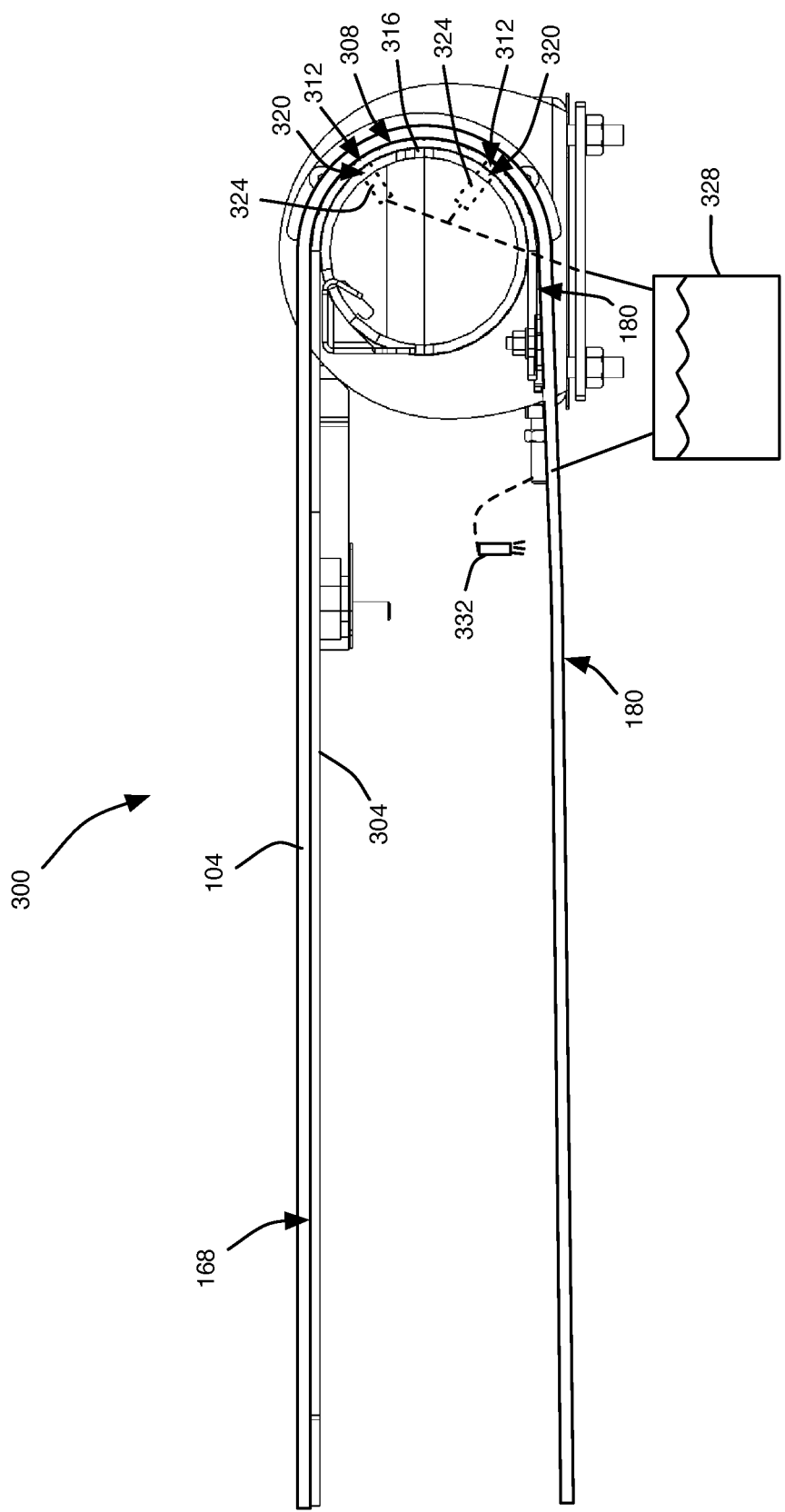
FIG. 14 is a side schematic view of a rollerless idler module having a fluid introduction arrangement for introducing fluid onto the endless belt in accordance with another embodiment.

FIG. 14 shows a vehicle conveyor system 300 with a rollerless idler module in accordance with another embodiment. Like elements of the vehicle conveyor system 300 that have been previously described and illustrated will be referenced with the same reference numerals. The vehicle conveyor system 300 includes a rollerless idler 304 that has a convex surface 308 with fluid apertures 312. The rollerless idler 304 is supported by a tubular support shaft 316 that has corresponding fluid apertures 320 that are aligned with the fluid apertures 312 of the rollerless idler 304 when the rollerless idler 304 is secured relative to the support shaft 316.

A first fluid introduction arrangement in the form of a set of fluid nozzles 324 are in fluid communication with a fluid source 328 and are positioned to introduce fluid from the fluid source 324 between the convex surface 308 and the endless belt 104 through the fluid apertures 312, 320. A second fluid introduction arrangement in the form of a set of fluid nozzles 332 are in fluid communication with the fluid source 324.

The first fluid introduction arrangement primarily serves to lubricate between the rollerless idler 304 and the endless belt 104 to reduce friction between, and thus wear of, the rollerless idler 304 and the endless belt 104. The second fluid introduction arrangement primarily serves to wash debris from the lower return portion 180 of the endless belt 104 prior to its contact with the rollerless idler 304 so that the debris does not gouge the surface of the rollerless idler 128 or damage the endless belt 104. The first and second fluid introduction arrangements can draw from the same or separate fluid sources. In the illustrated configuration, the single fluid source 328 is employed and is a combination of water and a surfactant that both helps wash debris from the endless belt 104 and lubricate between the rollerless idler 304 and the endless belt 104. In other embodiments, any suitable fluid for reducing friction between the endless belt 104 and the working surface of the rollerless idler 128 can be employed.

When lubricated with water alone, the coefficient of friction between the endless belt 104 and the working surface of the rollerless idler 128 is 0.14 when there is no dirt introduced between them, and 0.26 when there is dirt between the endless belt 104 and the working surface. These coefficients of friction decrease when a surfactant or other lubricating additive is added.

Any other suitable means for lubricating the working surface of the rollerless idler and/or rinsing debris from the lower return portion of the endless belt 104 can be employed with the correlator systems disclosed herein.

By making the rollerless idler of a similar construction as the wear plates providing the support surface, which have a regular maintenance/replacement schedule, the rollerless idler can also be replaced and/or maintained at the same time, thus aligning the maintenance schedules. Further, specialized knowledge about servicing bearings is alleviated for this maintenance.

While, in the above-described embodiments, the rollerless idler is generally made as a unitary component, it will be appreciated that the rollerless idler can be assembled from multiple components. Further, the shape and design of the rollerless idler and the support structure can be varied.

While, in the above-illustrated embodiments, two endless belts are employed to transport a vehicle, in other embodiments, a single endless belt or three or more endless belts can be employed with the system described herein.

The rollerless idler module described above for vehicle conveyor systems can be employed with other belt conveyor systems for transporting other items apart from vehicles.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS 20 endless belt
24 roller
26 idler roller
28 support surface
32 upper transport portion
36 vehicle
40 drive end
44 trailing edge
TD travel direction 48 idler end
52 leading edge
56 support roller
60 lower return portion
64 outer surface
68 clearance gap
100 vehicle conveyor system
104 endless belt
108 vehicle
112 drive roller
116 trailing edge
120 upper transport portion
124 drive end
128 rollerless idler
132 leading edge
136 idler end
140 lower return portion
144 front drive surface
148 rear drive surface
152 support surface
156 conveyor frame
160 rollerless idler module
164 convex surface
168 upper transport surface
172 trailing edge
176 wear plate
180 lower return surface
184 support shaft
188 longitudinal end
192 end bracket
196 inner bracket portion
200 outer bracket portion
204 bolt
208 circular aperture
212 semi-circular aperture
216 toothed clamp
220 tooth
224 alignment screw
226 slot
228 support aperture
232 upper transport surface support
236 securing aperture
240 bar
300 vehicle conveyor system
304 rollerless idler
308 convex surface
312 fluid aperture
316 support shaft
320 fluid aperture
324 fluid nozzle
328 fluid source
332 fluid nozzle

What is claimed is:

1. A rollerless idler module for a vehicle conveyor system having an endless belt, a drive end at which the endless belt is driven to rotate, and an idler end opposite the drive end, comprising:
a rollerless idler having a working surface positionable to contact the endless belt at the idler end spanning between an upper transport portion of the endless belt extending towards the drive end and positioned to transport a vehicle thereon, and a lower return portion of the endless belt extending towards the drive end;
a support structure adapted to secure the rollerless idler in a substantially stationary orientation; and
a fluid introduction arrangement in fluid communication with a fluid source and positioned to introduce fluid onto the lower return portion of the endless belt prior to its contact with the rollerless idler.

2. The rollerless idler of claim 1, wherein the working surface includes a convex surface positionable to contact the endless belt at the idler end and spanning between the upper transport portion of the endless belt and the lower return portion of the endless belt extending towards the drive end.

3. The rollerless idler module of claim 2, wherein the working surface includes a substantially planar upper transport surface that is positioned to support the upper transport portion of the endless belt when the convex surface is positioned to contact the endless belt between the upper transport portion of the endless belt and the lower transport portion of the endless belt.

4. The rollerless idler module of claim 2, wherein the working surface includes a lower return surface extending from the convex surface that is positioned to contact the lower return portion of the endless belt when the convex surface is positioned to contact the endless belt between the upper transport portion of the endless belt and the lower return portion of the endless belt.

5. The rollerless idler module of claim 2, wherein a trailing edge of the upper surface is substantially oblique to a transverse axis that is normal to a travel direction of the upper transport portion of the endless belt when the convex surface is positioned to contact the endless belt between the upper transport portion of the endless belt and the lower transport portion of the endless belt.

6. The rollerless idler module of claim 1, wherein the working surface has surface properties selected such that the working surface and the endless belt have a coefficient of friction that prevents adhesion of the endless belt with the working surface as the endless belt is travelling therearound.

7. The rollerless idler module of claim 6, wherein the working surface has surface properties selected such that the working surface and the endless belt have a coefficient of friction that is lower than 0.50.

8. The rollerless idler module of claim 6, wherein the working surface has surface properties selected such that the working surface and the endless belt have a coefficient of friction that is lower than 0.36.

9. The rollerless idler module of claim 6, wherein the working surface has surface properties selected such that the working surface and the endless belt have a coefficient of friction that is lower than 0.20.

10. The rollerless idler module of claim 6, wherein the working surface has surface properties selected such that the working surface and the endless belt have a coefficient of friction that is lower than 0.30.

11. The rollerless idler module of claim 6, wherein the working surface has surface properties selected such that the working surface and the endless belt have a coefficient of friction that is lower than 0.15.

12. The rollerless idler module of claim 1, wherein the working surface is at least partially made of polytetrafluoroethylene.

13. The rollerless idler module of claim 1, wherein the working surface is at least partially made of a polymer.

14. The rollerless idler module of claim 13, wherein the polymer is an ultra high molecular weight polyethylene (UHMW).

15. The rollerless idler module of claim 14, wherein an additive is added to the UHMW to decrease the coefficient of friction of the working surface.

16. The rollerless idler module of claim 1, wherein the working surface is at least partially made of stainless steel.

17. The rollerless idler module of claim 1, wherein the support structure includes a shaft around which the rollerless idler is positioned, and at least one bracket adapted to secure the shaft.

18. The rollerless idler module of claim 17, wherein the shaft has at least one end with a non-circular profile, and wherein the at least one bracket has an aperture shaped to receive the at least one end of the shaft to prevent rotation of the shaft, and wherein an upper transport surface support extends from the shaft to support the rollerless idler extending from the convex surface and positioned above the shaft when the convex surface is positioned to contact the endless belt between the upper transport portion of the endless belt and the lower transport portion of the endless belt.

19. The rollerless idler module of claim 1, further comprising a fluid introduction arrangement in fluid communication with a fluid source and positioned to introduce fluid onto the endless belt through at least one aperture in the rollerless idler.

20. The rollerless idler module of claim 19, wherein the fluid includes a surfactant.

21. The rollerless idler module of claim 1, wherein the fluid includes a surfactant.

22. A vehicle conveyor system, comprising:
a vehicle conveyor system having an endless belt, a drive end at which the endless belt is driven to rotate, and an idler end opposite the drive end;
a rollerless idler having a working surface contacting the endless belt at the idler end spanning between an upper transport portion of the endless belt extending towards the drive end positioned to transport a vehicle thereon, and a lower return portion of the endless belt extending towards the drive end;
a support structure securing the rollerless idler in a substantially stationary orientation; and
a fluid introduction arrangement in fluid communication with a fluid source and positioned to introduce fluid onto the lower return portion of the endless belt prior to its contact with the rollerless idler.

23. The vehicle conveyor system of claim 22, wherein the working surface includes a convex surface contacting the endless belt at the idler end and spanning between the upper transport portion of the endless belt and the lower return portion of the endless belt extending towards the drive end.

24. The vehicle conveyor system of claim 23, wherein the working surface includes a substantially planar upper surface supporting the upper transport portion of the endless belt.

25. The vehicle conveyor system of claim 23, wherein the working surface includes a lower surface extending from the convex surface and contacting the lower return portion of the endless belt.

26. The vehicle conveyor system of claim 23, wherein a trailing edge of the upper surface is substantially oblique to a transverse axis that is normal to a travel direction of the upper transport portion of the endless belt.

27. The vehicle conveyor system of claim 22, wherein the working surface has surface properties selected such that the working surface and the endless belt have a coefficient of friction that prevents adhesion of the endless belt with the working surface as the endless belt is travelling therearound.

28. The vehicle conveyor system of claim 22, wherein the working surface is at least partially made of a polymer.

29. The vehicle conveyor system of claim 22, further comprising a fluid introduction arrangement in fluid communication with a fluid source and positioned to introduce fluid onto the endless belt through at least one aperture in the rollerless idler.

* * * * *